United States Patent [19]

Beeson

[11] 4,355,332
[45] Oct. 19, 1982

[54] VIDEO TAPE EDITING CONTROL SYSTEM

[75] Inventor: Gary H. Beeson, Santa Ana, Calif.

[73] Assignee: Convergence Corporation, Irvine, Calif.

[21] Appl. No.: 198,657

[22] Filed: Oct. 20, 1980

Related U.S. Application Data

[63] Continuation of Ser. No. 929,667, Jul. 31, 1978, abandoned.

[51] Int. Cl.³ .......................... H04N 5/76; G11B 27/02
[52] U.S. Cl. ........................................ 360/14.1; 369/4; 358/22; 358/182
[58] Field of Search ....................... 360/14, 33, 18, 24; 358/127, 182, 183, 22; 369/4

[56] References Cited

U.S. PATENT DOCUMENTS

| | | | |
|---|---|---|---|
| 3,673,324 | 6/1972 | Ito | 358/22 |
| 3,721,757 | 3/1970 | Ettlinger | 360/14 |
| 3,735,038 | 5/1973 | Loper | 358/183 |
| 4,040,098 | 8/1977 | Beeson | 358/127 |

OTHER PUBLICATIONS

*Television Broadcasting*, by H. E. Ennes, ©1973, by Howard W. Sams and Co., pp. 541-543, 313, 314.

*Primary Examiner*—Alan Faber
*Attorney, Agent, or Firm*—Keith D. Beecher

[57] ABSTRACT

A video tape editing control system is provided which is capable of controlling one or more source video tape recorders and a record video tape recorder so that video information from a first source video tape recorder may be recorded on the video tape in the record video tape recorder until a selected edit point is reached, at which point the video information from the first source video tape recorder is replaced by different video information from the same or from a different source video tape recorder. In the system of the invention, a dissolve is simulated by causing the video signals of the first video information to decrease during a predetermined number of frames until the edit point is reached without introducing the second video information to the record video tape recorder until the edit point is reached, and then by terminating the first video information at the edit point and by introducing only the second video information to the record video tape recorder after the edit point has been reached, and increasing the amplitude of the video signals of the second video information from a minimum value at the edit point to normal value throughout a predetermined number of frames after the edit point.

5 Claims, 5 Drawing Figures

VIDEO TAPE EDITING CONTROL SYSTEM

This application is a continuation of copending application Ser. No. 929,667, filed July 31, 1978 in the name of the present inventor, now abandoned.

BACKGROUND

Video tape editing control systems are described in U.S. Pat. No. 4,040,098, and in copending application Ser. No. 23,759, filed Mar. 23, 1979, now U.S. Pat. No. 4,272,790, both of which are assigned to the present assignee. These editing control systems are capable of controlling one or more source video tape recorders so that selected portions of the video information from the source video tape recorders may be recorded on a record video tape recorder, with any particular portion of the video information terminating at a selected edit point at which a second different portion commences. In these editing control systems, the portions of the video information change abruptly at the selected edit points.

Systems are known to the prior art, however, for causing each of the portions of video information to "dissolve" into one other at the edit points, instead of abruptly changing from one portion to the next. However, for a true dissolve, it is necessary for two source video tape recorders to be controlled by the editing control system simultaneously as a selected edit point is approached and passed, the video information from the first source video tape recorder is decreased to a minimum and the video information from the second source video tape recorder is increased to normal amplitude so that the video information from the first source video tape recorder is gradually replaced by the video information from the second source video tape recorder, and there is no abrupt transition from one to the other.

However, such a true dissolve requires that the two source video tape recorders be exactly in synchronism, or else distortions will occur during the dissolve period. Such synchronization requires expensive time-base correction circuitry and mixer circuitry. An example of such a true dissolve system, together with the required time-base correction circuits and mixer circuits may be found, for example, in Ettlinger U.S. Pat. No. 3,721,757.

In accordance with the present invention, however, dissolves are simulated without the need for such expensive time-base correction circuits and mixer circuits. This is because no effort is made in the system of the invention to control both source video tape recorders at the same time. Instead, as an edit point is approached, one of the video tape recorders is controlled to reduce the video signal portion of the video information being recorded gradually to a minimum, while the amplitude of the synchronizing signals remains unchanged. This creates a gradual decrease in the video signals being recorded on the tape in the record video tape recorder without any loss in the synchronizing signals, and with no distortion. Then, when the edit point is reached the recording is stopped. Now the second source video tape recorder and the record video tape recorder are cued back and rolled forward together, and only the second source video tape recorder is turned on with its synchronizing signals being recorded with full amplitude, as its video signals are gradually increased. The transition from the synchronizing signals of the first video information to the synchronizing signals of the second video information occurs between frames, so that there is no visible distortion.

When the video information recorded on the tape in the record video tape recorder is reproduced, the screen phosphor delay characteristics of the cathode-ray viewing tube of the reproducing equipment gives the appearance of a true dissolve as each edit point is approached and passed, although only the video information from a single source video tape recorder is being recorded at any one time, and although no attempt is made to control simultaneously two source video tape recorders.

DETAILED DESCRIPTION OF THE ILLUSTRATED EMBODIMENT

Figure 1:
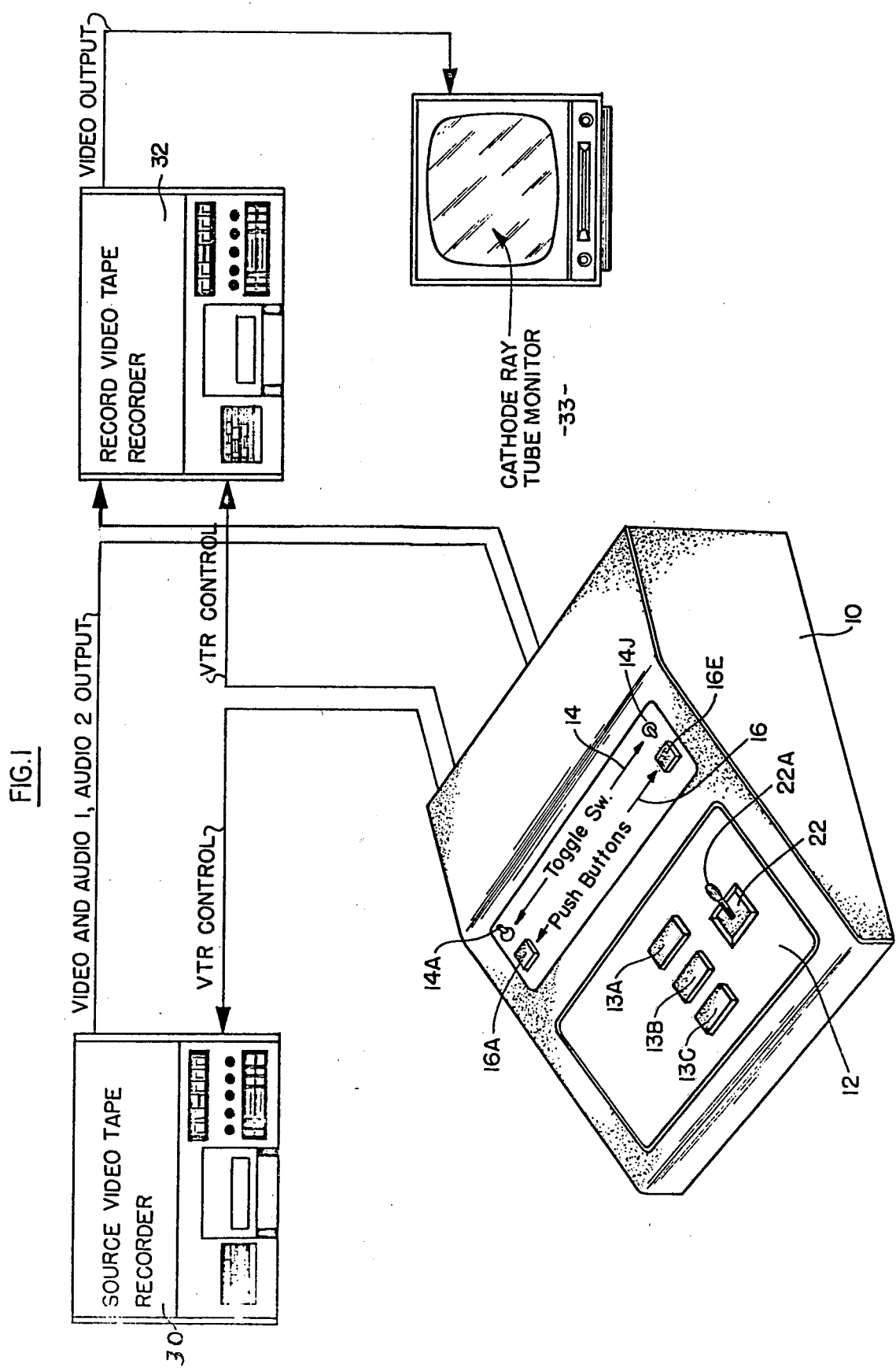
FIG. 1 is a perspective representation of a video tape editing control unit of the type described in copending application Ser. No. 23,759, and is a schematic representation of a source video tape recorder and a record video tape recorder, together with an appropriate monitor, all of which are controlled by the editing control unit.

As shown in FIG. 1, the video tape editing control unit in which the control system of the invention may be incorporated is contained in a housing 10, and is equipped with a joystick control panel 12, such as described in the copending application. A toggle switch panel 14 is mounted on the unit above the control panel 12, and a pushbutton switch panel 16 is also mounted on the unit above the control panel 12, as shown. As also described in the copending application, a four-position joystick control unit 22, with a joystick 22A, is mounted on control panel 12. The toggle switch panel 14 includes a series of toggle switches 14A-14J for controlling circuits within the unit 10, as also described in detail in the copending application. The pushbutton panel 16 includes pushbutton switches 16A-16E which constitute remote controls for the source and record video tape recorders 30 and 32, as also described in the copending application. The auto joystick control panel 12 also includes three pushbutton switches designated 13A, 13B and 13C for controlling the operation of the system in the performance of edits. The foregoing controls, as mentioned, are fully described in the copending application, and since these controls per se do not represent any part of the present invention, a further description is deemed to be unnecessary.

As described in the copending application, when joystick 22A is momentarily deflected to its upper position, it assigns the joystick circuit to the record video tape recorder 32 of FIG. 1. Deflecting the joystick 22A momentarily to its lower position causes the record video tape recorder 32 to be disengaged from the joystick control, and causes the source video tape recorder 30 of FIG. 1 to be engaged by the joystick control. Then, by moving the joystick 22A to the right causes the video tape recorder assigned to the joystick control to be moved in a forward direction at a speed determined by the amount of joystick deflection; and by moving the joystick 22A to the left causes the video tape recorder assigned to the joystick control to be moved in the reverse direction at a speed determined by the amount of joystick deflection.

The editing control unit 10 controls the source video tape recorder 30 and the record video tape recorder 32, with the video information recorded on the two recorders being displayed on the cathode-ray tube monitor 33 on a time-shared basis. When joystick 22 is set to control the source video tape recorder 30, the video information on the tape in the source video tape recorder is displayed on the monitor, and when the joystick is set to control the record video tape recorder 32, the video information on the tape in the record video tape recorder appears on the monitor.

Accordingly, and as described in the aforesaid patent and copending application, the source video tape recorder 30 may be controlled by unit 10 to record selected video information on the tape in the record video tape recorder 32 until a selected edit point is reached. At that point, different video information is recorded on the tape in the record video tape recorder derived, for example, from the same source video tape recorder 30, or from a separate video source.

As will be described, the control system of the present invention controls the source video tape recorder 30 as a selected edit point is reached, so that, commencing a selected number of frames before the edit point, the video signals recorded on the tape in the record video tape recorder 32 are reduced in amplitude, from normal amplitude down to a predetermined minimum level while the synchronizing signals are maintained at normal full amplitude.

Figure 2:
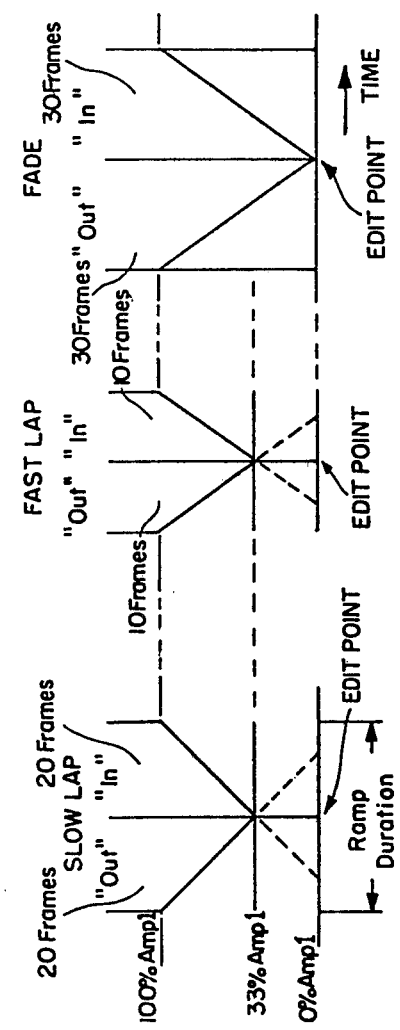
FIG. 2 is a representation of curves useful in explaining the operation of the control system of the invention.

As shown by the curves in FIG. 2, a "slow lap" may be achieved by reducing the video signal amplitude of the video signals from the source video tape recorder 30, as recorded on the record video tape recorder 32 from 100% amplitude to 33⅓% amplitude throughout twenty frames until the edit point is reached. When the edit point is reached, the source video tape recorder 30 is turned off. For a "fast lap," the same control is exerted, but throughout ten frames, rather than twenty frames, by way of example. For both the laps, the amplitude is reduced only to 33⅓%, at which time the source video tape recorder is turned off. In a "fade" operation, and as shown in the curve to the right in FIG. 2, the amplitude of the video signals is reduced directly to zero (black level) at the edit point, throughout, for example, thirty frames, at which time the source video tape recorder 30 is turned off.

The foregoing operations concern the out-edit point, at which the video information recorded on the record video tape recorder 32 from the source video tape recorder is terminated at the edit point. It is to be remembered that throughout this operation, the synchronizing signals of the video information continue at normal full amplitude, so that normal synchronization is maintained right up to the edit point.

At the edit point, new video information is recorded on the record video tape recorder 32. This new video information may be obtained from a different point on the tape of the same source video tape recorder 30, or from another video source. It is to be understood that all previous control of the source video tape recorder 30 terminated at the edit point.

Now, when the new information is being recorded on the tape in the record video tape recorder 32, the source video tape recorder 30, or another video source, is controlled individually to start at the edit point with a certain minimum value of the video signals in the video information, but with normal full synchronizing signal amplitude. During this latter operation, the synchronizing signals of the latter video information take over for synchronizing purposes, with the interchange between the synchronizing signals of the previous video information and of the present video information occurring at the edit point, and between frames, so that there is no visible distortion.

With respect to the new video information, the edit point now represents the in-edit point and, as shown in the "slow lap" the increase from 33⅓% to full amplitude may occur in twenty frames, whereas in the "fast lap" the increase occurs in ten frames. Also, for the "fade" the increase occurs from zero (black level) to normal amplitude in thirty frames.

It should be reiterated that in each instance, before the edit point, a single source video tape recorder is controlled with its video signals being linearly reduced in amplitude, and after the edit point, again, a single video tape recorder is controlled with its video signals increasing linearly from minimum to normal amplitude. At no time is there any attempt made to control two source video tape recorders simultaneously, and at all times synchronizing signal amplitudes remain at full value and are recorded only from one source video tape recorder at a time, so that synchronizing problems are obviated.

Figure 3A:
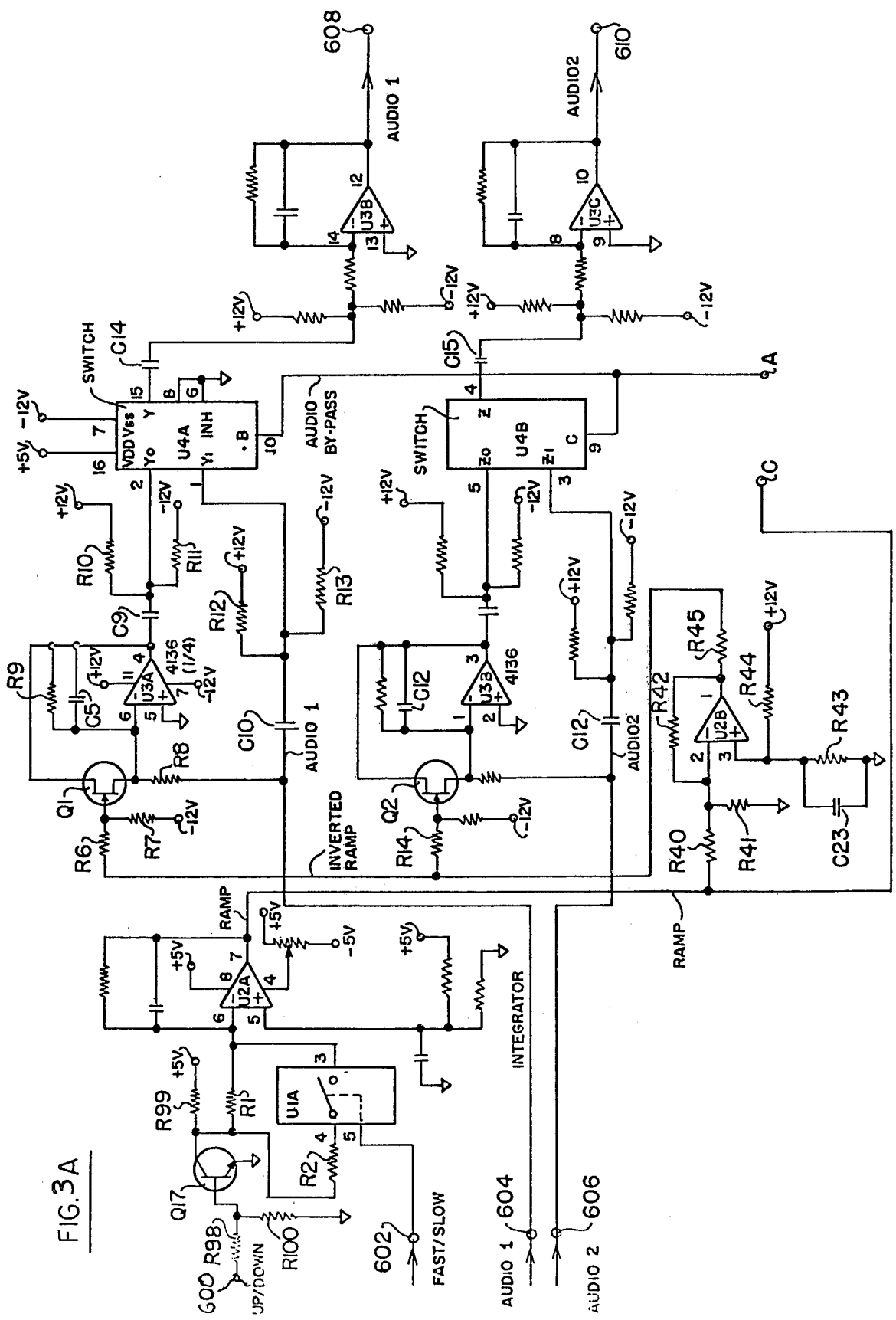
FIGS. 3A, 3B and 3C are schematic diagrams of the control system of the invention in one of its embodiments, and which may be incorporated into the editing control unit of FIG. 1.
Figure 3B:
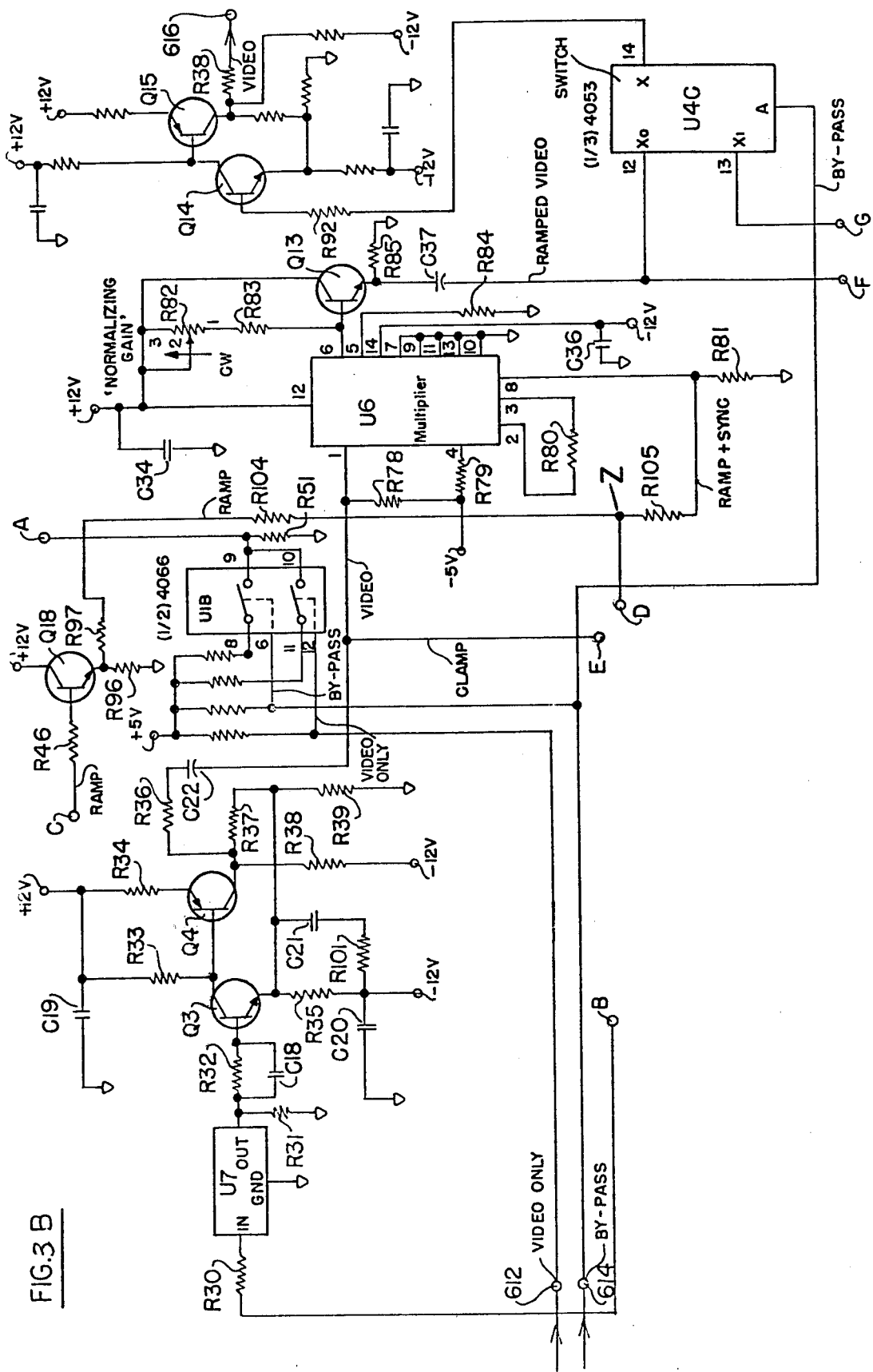
Figure 3C:
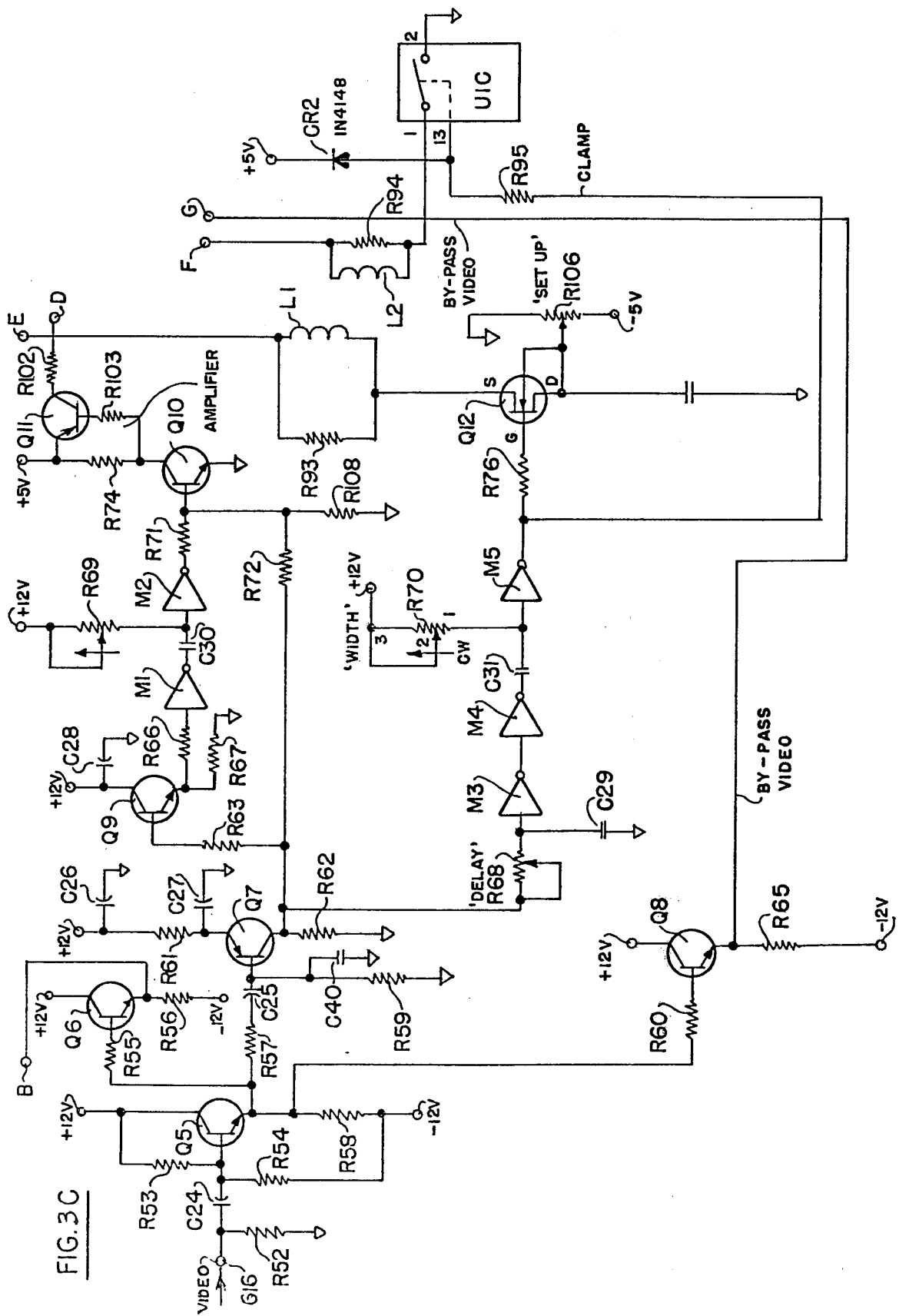

Reference is now made to FIGS. 3A, 3B and 3C for a detailed explanation of the circuitry of the simulated dissolve control system of the invention. As shown in FIG. 3A, a positive-going and negative-going pulse signal is applied to input terminal 600, to determine whether the ramp generated in the system will increase with time, for signal processing at the in-edit point, or will decrease with time for signal processing at the out-edit point. Input terminal 600 is connected through a 10 kilo-ohm resistor R98 to the base of a grounded emitter transistor Q17 and to a grounded 4.7 kilo-ohm resistor R100. Transistor Q17 may be an NPN transistor of the type designated 2N3565. The collector of the transistor is connected through a 4.7 kilo-ohm resistor R99 to the positive terminal of a 5 volt source, and through a 1 megohm resistor R1 to the minus input of an operational amplifier U2 and to pin 3 of a transmission gate U1A. Amplifier U2 is connected as an integrator for generating the ramp, and it may be one-half a T1082CP. The transmission gate U1A may be one-quarter a 4066. The collector is also connected through a 1 megohm resistor R2 to pin 4 of transmission gate U1A. A second input terminal 602 is connected to pin 5 of transmission gate U1A.

For fade, the command introduced to input terminal 602 is the slow command, and the microprocessor turns on the record video tape recorder at a different time from a lap. That is, the microprocessor coordinates the ramp generator to start the ramp at a particular time so that its level will be 33% of full amplitude when the record video tape recorder reaches an in-edit point for a lap, and so that the ramp will be at zero amplitude at the in-edit point for a fade. Specifically, for a lap at the in-edit point, the microprocessor turns on the record video tape recorder at a time when the ramp is achieved, for example, 33% amplitude, as shown in FIG. 2, whereas, for a "fade" the microprocessor turns on the record video tape recorder at zero amplitude of the ramp, as also shown in FIG. 2. Likewise, at the out-edit point, the converse takes place.

A fast/slow command is applied to input terminal 602, depending upon the setting of an appropriate switch. For the fast command, the transmission gate U1A closes to place the resistor R2 in parallel with resistor R1 for a fast ramp, whereas for the slow command, the transmission gate U1A is opened, so that only the resistor R1 is in the integrator for the slow ramp. As explained above, the fast ramp may have a duration of one-half second, whereas the slow ramp may have a duration of one second. The operational amplifier U2A generates a ramp at its output pin 7, which increases with time or decreases with time, depending upon the up/down command applied to input terminal 600.

The audio 1 from the video tape in the source VTR 30 is introduced to an input terminal 604, and the audio 2 from the same or different source VTR is introduced to an input terminal 606. Terminal 604 is connected to the minus input of an operational amplifier U3A through a 150 kilo-ohm resistor R8. The plus input of amplifier U3A is grounded. The output is connected to a 0.1 microfarad capacitor C9 which, in turn, is connected to pin 2 of a switch U4A. Switch U4A may be one-third an integrated circuit 4053. Pin 1 of switch U4A is also connected through a 47 kilo-ohm resistor R12 to the positive terminal of a 12 volt source, and through a 47 kilo-ohm resistor R13 to the negative terminal of the 12 volt source.

A field effect transistor Q1, which may be of the type designated 2N4303 is connected in the feedback path of amplifier U3A, as shown. The source electrode of the field effect transistor is connected to the minus input of amplifier U3A, and the drain electrode is connected to the output of the amplifier. A 150 kilo-ohm resistor R9 is connected between the output and minus input of the amplifier, the resistor being shunted by a 0.001 microfarad capacitor C5.

The ramp output of amplifier U2A is introduced through a 10 kilo-ohm resistor R40 to the minus input of an amplifier U2B which may be one-half an integrated circuit TL082. Amplifier U2B inverts the ramp, so that an inverted ramp appears at its output, which is introduced through a 1 kilo-ohm resistor R45 and through a 33 kilo-ohm resistor R6 to the gate electrode of field effect transistor Q1. The gate electrode is also connected through a 75 kilo-ohm resistor R7 to the negative terminal of a 12 volt source.

Therefore, as the inverted ramp increases or decreases with time, the field effect transistor Q1 controls the gain of the amplifier U3A and, therefore, the gain of the audio signal introduced thereby to pin 2 of the switch U4A.

The inverted ramp is also introduced through a 33 kilo-ohm resistor R14 to a field effect transistor Q2 which likewise may be of the type designated 2N4303. The field effect transistor Q2 is connected in circuit with an amplifier U3B in exactly the same manner as field effect transistor Q1 is connected in circuit with amplifier U3A, so as to form an attenuator for the audio 2 which is introduced to pin 5 of a switch U4B.

The audio 1 signal is passed through switch U4A to pin 15 which is coupled through a 0.1 microfarad capacitor C14 and through an output amplifier U3B to an output terminal 608. Likewise, the audio 2 appears at pin 4 of switch U4B, and is coupled through a 0.1 microfarad capacitor C15 and through an output amplifier U3C to an output terminal 610. The amplifier U3B and U3C may each be one-quarter an integrated circuit of the type designated 4136.

Therefore, in the absence of a by-pass signal, the audio 1 and audio 2 from the source VTR is processed by the circuit of FIG. 3A, and is either increased in amplitude along with the video, or decreased in amplitude with the video, depending upon whether a lap or fade operation is carried out at the out-edit point or in-edit point.

However, when an appropriate switch is set to either "VIDEO ONLY" or to "OFF," appropriate commands are introduced to input terminals 612 and 614 of FIG. 3B. Commands at either one of these terminals causes a transmission gate U1B to close, so that an audio by-pass command is introduced to pin B and C respectively of transmission gates U4A and U4B of FIG. 3A by way of terminal A. When that occurs, the audio 1 and audio 2 signals are directly coupled to the output amplifiers U3B and U3C respectively through capacitors C10 and C12, and the audio is not processed by the system.

The video input is introduced to the circuit of FIG. 3C by way of an input terminal 616. Input terminal 616 is coupled through a 47 microfarad capacitor C24 to the base of an NPN transistor Q5. Transistor Q5 may be of the type designated 2N3563. The transistor is connected as an input isolation emitter follower amplifier. The collector is directly connected to the positive terminal of the 12 volt source and back to the base through a 9.1 kilo-ohm resistor R53. The emitter is connected to the negative terminal of the 12 volt source through 4.7 kilo-ohm resistor R58. The base is also connected to the negative terminal through a 12 kilo-ohm resistor R54. Input terminal 616 is also connected to a 75 ohm grounded resistor R52.

The emitter of transistor Q5 of FIG. 3C is connected through a 470 ohm resistor R55 to the base of an NPN emitter follower transistor Q6. Transistor Q6 may be of the type designated 2N3563. The emitter of transistor Q6 is connected through a 2.7 kilo-ohm resistor R56 to the negative terminal of the 12 volt source, and by way of terminals B and through a 510 ohm resistor R30 to a delay line U7 in FIG. 3B.

The output of delay line U7 in FIG. 3B is connected to a grounded 510 ohm resistor R31 and through a 470 ohm resistor R32 to the base of an NPN transistor Q3 which may be of the type designated 2N3563. Resistor R32 is shunted by a 150 picofarad capacitor C18. The collector of transistor Q3 is connected to the base of a PNP transistor Q4 which may be of the type designated 2N3906. The collector of transistor Q3 is also connected through a 2.2 kilo-ohm resistor R33 to the positive terminal of the 12 volt source, and the emitter of transistor Q4 is connected through a 22 ohm resistor R34 to the terminal. The terminal is also connected to a grounded 0.1 microfarad capacitor C19.

The emitter of transistor Q3 is connected through a 10 kilo-ohm resistor R35 to the negative terminal of the 12 volt source, which terminal is connected to a grounded 0.1 microfarad capacitor C20. Resistor R35 is shunted by a resistor R101 and by a 150 picofarad capacitor C21.

The collector of transistor Q4 is connected through a 680 ohm resistor R38 to the negative terminal of the 12 volt source, and through a 470 ohm resistor R37 to a grounded 470 ohm resistor R39, and to the emitter of transistor Q3. The collector of transistor Q4 is connected through a 100 ohm resistor R36 to a 1 microfarad capacitor C22. Capacitor C22 introduces amplified video to pin 1 of a video attenuator U6, which may be an integrated multiplier of the type designated LM1496.

The ramp signal from amplifier U2A of FIG. 3A is also introduced by way of terminal C through a 4.7 kilo-ohm resistor R46 to an NPN emitter follower transistor Q18 in FIG. 3B, which may be of the type designated 2N3565. The collector of transistor Q18 is connected to the positive terminal of the 12 volt source, and the emitter is connected to a 750 ohm grounded resistor R96. The emitter is also connected through a 1 kilo-ohm resistor R97 and through a 4.7 kilo-ohm resistor R104 and through a 33 kilo-ohm resistor R105 to pin 8 of multiplier U6. Pin 8 is also connected to a grounded 1 kilo-ohm resistor R81.

The ramp causes the video signal either to increase or decrease, determined by the up/down command introduced to terminal 600 of FIG. 3A, and the ramped video output is introduced from pin 6 of multiplier U6 to the base of an NPN transistor Q13 which may be of the type designated 2N3563. The base is also connected through a 1 kilo-ohm resistor R83 and through a 1 kilo-ohm potentiometer R82 to the collector and to the positive terminal of the 12 volt source. The positive terminal is connected to a 0.1 microfarad grounded capacitor C34. The potentiometer R82 is served as a "normalizing gain potentiometer."

The emitter of transistor Q13 is connected to a grounded 1 kilo-ohm resistor R85, so that the transistor functions as an emitter follower. The emitter is coupled through a 1 microfarad capacitor C37 to pin 12 of a switch U4C in FIG. 3B. The output pin 14 of switch U4C is connected through a 470 ohm resistor R92 to the base of an NPN transistor Q14 which may be of the type designated 2N3563. Transistor Q14 is connected to a PNP transistor Q15 of the type 2N3906, and the transistors function as an output amplifier for the video signal.

The collector of transistor Q15 is connected through a 75 ohm resistor R38 to output terminal 616, and the output video appears at the output terminal.

So long as the by-pass command is not applied to input terminal 614 of the circuit of FIG. 3B, switch U4C connects the ramped video from the multiplier U6 to the output terminal 616. However, when the by-pass command is applied to input terminal 614, switch U4C is controlled to introduce by-pass video from pin 13 to output pin 14, so that unprocessed by-passed video then appears at output terminal 616. The by-pass video being received from emitter follower transistor Q8 of FIG. 3C by way of terminal G. The emitter follower transistor Q8 may be of the type designated 2N3563, and its base is connected to the emitter of emitter follower Q5 in FIG. 3C through a 470 ohm resistor R60. The collector of transistor Q8 is directly connected to the positive terminal of the 12 volt source, and the emitter is connected to the negative terminal of the 12 volt source through a 2.7 kilo-ohm resistor R65. Transistor Q8 operates as an isolation stage. The by-pass video appears at the emitter of transistor Q8, and is applied to pin 13 of switch U4C, so that when the by-pass command is applied to terminal 614 of the circuit of FIG. 3B, the switch U4C introduces by-pass video rather than ramp video to the output amplifier of transistors Q14 and Q15 for application to output terminal 616.

The emitter follower Q5 is also connected through a 330 ohm resistor R57 to a 47 microfarad capacitor C25 which, in turn, is connected to the base of a PNP transistor Q7 which may be of the type designated 2N3906. The base of the transistor is also connected to a 150 picofarad grounded capacitor C40 and to a 1.5 megohm grounded resistor R59. The emitter is connected to the positive terminal of the 12 volt source through a 620 ohm resistor R61, which terminalk is connected to a grounded 4.7 microfarad capacitor C26. The emitter is also connected to a 4.7 microfarad grounded capacitor C27. The collector of the transistor is connected to a grounded 1 kilo-ohm resistor R62.

Transistor Q7 serves as a sychronizing signal separator, and the resulting vertical and horizontal synchronizing signals appear across resistor R62. These signals are introduced through a 15 kilo-ohm resistor R72 to the base of a grounded emitter transistor Q10 of the type designated 2N3565. The base of transistor Q10 is connected to a grounded 1 kilo-ohm resistor R108. The collector of transistor Q10 is connected through a 4.7 kilo-ohm resistor R74 to the positive terminal of the 5 volt source, and through a 4.7 kilo-ohm resistor R103 to the base of a PNP transistor Q11 which may be of the type designated 2N3906. The emitter of transistor Q11 is connected to the positive terminal of the 5 volt source, and the collector is connected through a 1 kilo-ohm resistor R102 and by way of terminal D to a point Z at the junction of resistors R104 and R105 in the circuit of FIG. 3B.

The synchronizing signals are mixed with the ramp at point Z, (FIG. 3B) so that for the synchronizing interval, the ramp is returned to maximum amplitude level, so that synchronization is maintained, even though the video signal is being attenuated towards zero, that is, the horizontal and vertical sync signals are passed with normal amplitude, regardless of the level of the video signal. Transistors Q10 and Q11 function as an amplifier.

The collector of transistor Q7 is also connected through a 10 kilo-ohm resistor R63 to the base of an NPN transistor Q9 which may be of the type designated 2N3565. Transistor Q9 is connected as an emitter follower. Its collector is directly connected to the positive terminal of the 12 volt source and to a grounded 4.7 microfarad capacitor C28. Its emitter is connected to a grounded 4.7 kilo-ohm resistor R67 and through a 4.7 kilo-ohm resistor R66 to a Schmitt trigger M1. The Schmitt trigger M1 may be of the type designated 74C14. The output of Schmitt trigger M1 is coupled through a 0.001 microfarad capacitor C30 to a second Schmitt trigger M2 which, likewise, may be of the type designated 74C14. Capacitor C30 is also connected through a 1 kilo-ohm potentiometer R69 to the positive terminal of the 12 volt source. Schmitt trigger M2 is connected through a 15 kilo-ohm resistor R71 to grounded emitter transistor Q10. The Schmitt triggers assure that transistors Q10 is conductive only during the synchronizing signal interval, so that no video signal is modulated on the ramp at point Z.

The synchronizing signal separator transistor Q7 is also connected through a 5 kilo-ohm delay potentiometer R687 to a Schmitt trigger M3 which may be of the type designated 7C14. The resistor is also connected to a grounded 150 picofarad capacitor C29. Schmitt trigger M3 is connected to a second Schmitt trigger M4 which, likewise, may be of the type designated 34C14. The output of Schmitt trigger M4 is coupled through a 0.001 microfarad capacitor C31 to a further Schmitt trigger M5 which likewise may be of the type designated 74C14. Capacitor C31 is also connected through a 100 kilo-ohm potentiometer R70 to the positive terminal of the 12 volt source. Potentiometer R70 provides a width control for the pulse generated by the Schmitt trigger M5.

The output of Schmitt trigger M5 is connected through a 10 kilo-ohm resistor R76 to a switch Q12 which may be of the type designated 2N4303. The switch Q12 is turned on for the duration of the pulse from the Schmitt trigger M5 and serves as a clamp for the video signal introduced to pin 1 of multiplier U6 in FIG. 3B. The clamp signal is introduced to the video lead through terminals EE of FIGS. 3C and 3B. The clamp clamps the video to a voltage established by the setting of a 5 kilo-ohm potentiometer R106. The clamp is made to occur during the color burst interval of the video signal, and serves to hold the video signal at a predetermined direct current level, so as to avoid drift. An inductance coil L1 of, for example, 100 microhenries is connected in series with the switch Q12 and the video lead, so that the color burst itself is not attenuated. Inductance coil L1 is shunted by a 100 kilo-ohm resistor R93.

The output of Schmitt trigger M5 is also applied through a 4.7 kilo-ohm resistor R95 to pin 13 of a transmission gate U1C which may be one-quarter of an integrated circuit designated 4066. The clamp signal causes the transmission gate to close for the duration of the signal and to establish the ramp video at ground potential for the duration of the color burst. A 100 microfarad inductance coil L2, shunted by a 1 kilo-ohm resistor R94 is provided, so that the color burst itself is not attenuated. Since there is direct current coupling between the switch U4C and the output amplifiers Q14 and Q15, the clamp serves to hold the direct current level of the video at ground potential, and prevents drift.

The invention provides, therefore, a simple and efficient circuit for simulating laps and fades at the edit points. These effects are created without the need for multiple source video tape recorders with time base correctors, and other complex circuitry, as is required in the prior art.

While a particular embodiment of the invention has been shown and described, modifications may be made. It is intended in the claims to cover the modifications which come within the spirit and scope of the invention.

What is claimed is:

1. In a video editing control system for controlling the recording of successive frames of first video information from a video information source onto a video tape in a record video tape recorder up to a selected edit point on the tape, and for then controlling the recording of successive frames of second video information from the video information source onto the video tape in the record video tape recorder after the selected edit point on the tape, the combination of: circuit means coupled to the video information source and to the record video tape recorder for causing only the first video information to be recorded on the tape in the record video tape recorder up to the selected edit point, and for causing only the second video information from the video information source to be recorded on the tape in the record video tape recorder after the edit point; and a control system coupled to said circuit means for reducing the amplitude of the first video information from a particular value to a predetermined minimum value over a predetermined number of frames up to said edit point and terminating the recording of the first video information at the edit point, and for commencing the recording of the second video information at the edit point and for increasing the amplitude of the second video information from a predetermined minimum value to a particular value over a predetermined number of frames following the edit point.

2. The combination defined in claim 1, in which the first video information includes video signals and synchronizing signals, and in which the second video information includes video signals and synchronizing signals, and in which said circuit means reduces the amplitude only of the video signals of the first and second video information, and the amplitude of the recorded synchronizing signals of the first and second video information remains unchanged.

3. The combination defined in claim 2, in which the selected edit point occurs between the last frame of the first video information and the first frame of the second video information.

4. The combination defined in claim 2, in which the video signals have a normal amplitude value and a black level, and in which the circuit means causes the amplitude of the video signals to decrease from the normal amplitude level to the black level at the selected edit point, and causes the amplitude of the video signals of the second video information to increase from the black level to the normal amplitude level after the edit point.

5. The combination defined in claim 2, in which the video signals of the first video information and of the second video information have a normal amplitude level and a black level, and in which said circuit means reduces the amplitude of the video signals of the first video information from the normal amplitude level to a level intermediate the normal level and the black level as the edit point is approached, and increases the amplitude of the video signals of the second video information from a level between the normal amplitude level and the black level to the normal amplitude level as the edit point is departed from.

* * * * *